United States Patent
Tawaraya et al.

(10) Patent No.: US 7,468,776 B2
(45) Date of Patent: Dec. 23, 2008

(54) LIQUID CRYSTAL DISPLAY APPARATUS

(75) Inventors: Seiji Tawaraya, Tokyo-to (JP);
Tomohisa Honda, Tokyo-to (JP);
Tomonobu Sumino, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 254 days.

(21) Appl. No.: 10/578,292

(22) PCT Filed: Nov. 5, 2004

(86) PCT No.: PCT/JP2004/016427
§ 371 (c)(1),
(2), (4) Date: May 4, 2006

(87) PCT Pub. No.: WO2005/045515

PCT Pub. Date: May 19, 2005

(65) Prior Publication Data
US 2007/0103635 A1 May 10, 2007

(30) Foreign Application Priority Data
Nov. 10, 2003 (JP) ............................ 2003-380203

(51) Int. Cl.
*G02F 1/1339* (2006.01)
(52) U.S. Cl. ...................... 349/155; 349/156
(58) Field of Classification Search ............... 349/155, 349/156
See application file for complete search history.

(56) References Cited

U.S. PATENT DOCUMENTS

2003/0048403 A1 * 3/2003 Satoh .................... 349/156

FOREIGN PATENT DOCUMENTS

| JP | 3-15824 | 1/1991 |
|---|---|---|
| JP | 10-123534 | 5/1998 |
| JP | 11-264968 | 9/1999 |
| JP | 2000-338503 | 12/2000 |
| JP | 2002-31805 | 1/2002 |
| JP | 2002-182220 | 6/2002 |
| JP | 2002-214622 | 7/2002 |
| JP | 2002-341354 | 11/2002 |
| JP | 2003-84289 | 3/2003 |
| JP | 2003-121857 | 4/2003 |
| JP | 2003-131238 | 5/2003 |
| JP | 2003-156750 | 5/2003 |

* cited by examiner

*Primary Examiner*—Frank G Font
*Assistant Examiner*—Michael P Mooney
(74) *Attorney, Agent, or Firm*—Ladas & Parry LLP

(57) ABSTRACT

A liquid crystal display apparatus having a large displacement amount in a small load range, without generation of gravity mura, low temperature foaming, or the like as mentioned above, and also having a sufficient strength against a local load; and furthermore, capable of constantly producing a gap between the transparent substrates. The liquid crystal display apparatus has at least two sheets of transparent substrates, a liquid crystal layer sealed between the two sheets of transparent substrates, and a plurality of columnar spacers formed between the two sheets of transparent substrates. The displacement amount between the 80 mN to 400 mN load is in a range of 0.1 mm to 0.8 mm, and the displacement amount between the 600 mN to 950 mN load is in a range of 0.05 mm to 0.5 mm at the time of applying a load.

16 Claims, 3 Drawing Sheets

LIQUID CRYSTAL DISPLAY APPARATUS

TECHNICAL FIELD

The present invention relates to a liquid crystal display apparatus having an excellent display quality and capable of keeping an even cell gap.

BACKGROUND ART

According to a liquid crystal display apparatus, display is carried out by forming a thin liquid crystal layer by sealing a liquid crystal composition between a display side substrate and a liquid crystal drive side substrate facing with each other, and selectively changing the amount of the transmitted light or the reflected light of the display side substrate while electrically controlling the liquid crystal sequence in the liquid crystal layer by the liquid crystal drive side substrate.

Such a liquid crystal display apparatus has various driving systems such as the static drive system, the simple matrix system, and the active matrix system. Recently, as a flat display for a personal computer, a portable information terminal, or the like, a color liquid crystal display apparatus using a liquid crystal panel of the active matrix system or the simple matrix system has rapidly been spread.

FIG. 7 shows an example of a liquid crystal display apparatus panel of the active matrix system. The liquid crystal display apparatus 101 has the structure with a color filter 11 as the display side substrate and a TFT array substrate 12 as the liquid crystal drive side substrate facing with each other with a gap part 13 of about 1 to 10 µm provided therebetween, and the gap part 13 filled with a liquid crystal L and the circumference thereof sealed with a sealing material 14. The color filter 11 has the structure with a black matrix layer 16 formed in a predetermined pattern for shielding the light at the boundary part between the pixels, a pixel part 17 with a plurality of colors (in general, three primary colors of red (R), green (G) and blue (B)) arranged in a predetermined order for forming each pixel, an overcoat 18 and a transparent electrode 19 laminated in this order on the transparent substrate 15 from the side closer to the transparent substrate.

On the other hand, the TFT array substrate 12 has the structure with the TFT elements arranged on a transparent substrate and a transparent electrode provided (not shown). Moreover, an alignment layer 20 is provided on the inner surface side of the color filter 11 and the TFT array substrate 12 facing thereto. Then, by controlling the light transmittance of the liquid crystal layer on the rear side of the pixels colored in each color, a color image can be obtained.

Here, the thickness of the gap part 13, that is, the cell gap (the gap distance between the display side substrate and the liquid crystal drive side substrate) is the thickness of the liquid crystal layer itself. Thus, for preventing the display mura such as the color mura and the contrast mura for providing the favorable display performances such as the even display, the quick response, the high contrast ratio and the wide view angle to the color liquid crystal display apparatus, the cell gap needs to be kept constant and even.

As a method for keeping the cell gap, there is a method of scattering a large number of spherical or rod like particles 21 of a certain size, made of a glass, an alumina, a plastic, or the like in the gap part 13 as the spacer, attaching the color filter 11 and the TFT array substrate 12 and injecting a liquid crystal. According to the method, the cell gap is determined and kept to the size of the spacer.

However, according to the method of scattering the particles in the gap part as the spacer, there have been the problems of such as facilitating an eccentricity of the spacer distribution. As a method for solving these problems of the particle like spacers, as shown in FIG. 8, a columnar spacer 22 having a height corresponding to the cell gap is formed in a region on the inner surface side of the color filter 11 which coincides with the position where the black matrix layer 16 is formed (non display area). The columnar spacer 22 is formed by coating a photosetting resin onto a transparent substrate of a color filter by an even thickness and carrying out the pattern exposure of the obtained coating film by the photolithography to cure the film in the region where the black matrix layer is formed, that is, in the non display area.

The columnar spacer is required to have a characteristic to be deformed easily with respect to a minute load. This is due to the following reason. For example, when the liquid crystal is left at a low temperature, the all members comprising the liquid crystal display apparatus tend to be contracted. Since the liquid crystal material has the largest contraction percentage among the constituent members, it is contracted in the direction so as to reduce the gap between the transparent substrates. At the time, if the deformation of the columnar spacer cannot follow the reducing of the gap, a negative pressure is generated inside the liquid crystal display apparatus, and as a result, vacuum bubbles (low temperature bubbles) can easily be generated in the liquid crystal display apparatus.

Moreover, for example at the time of using the liquid crystal display apparatus, heat is applied to the liquid crystal display apparatus by the heat emitted form the back light. In this case, the all members comprising the liquid crystal display apparatus tend to be expanded. In this case also, since the liquid crystal material has the largest expansion rate among the constituent members, it is expanded in the direction so as to widen the gap between the transparent substrates. At the time, as the case mentioned above, if the deformation of the columnar spacer cannot follow the above-expansion speed of the gap, a pressure is generated inside the liquid crystal cell, and as a result, a void is generated between the transparent substrate and the liquid crystal layer. Thereby, the liquid crystal material leaks out of the void so that the overflowed liquid crystal material drops off from the liquid crystal cell by the gravity so as to generate the mura (gravity mura).

On the other hand, it is required that the displacement amount of the columnar space is small at the time when a strong force was applied thereon and then eliminated therefrom. The reason is that, for example, in the finger push test or the like, when the local load was applied on the liquid crystal cell and if the displacement amount is large after elimination of the load, poor display quality may be caused.

Here, since the two characteristics contradict with each other, it is difficult to form a columnar spacer having both of the above-mentioned characteristics. Thus, it is difficult to form a liquid crystal display apparatus having a large deformation with respect to a minute load and a small displacement amount against a strong force.

A prior art has not been found out concerning the present invention.

DISCLOSURE OF THE INVENTION

Problem to be Solved by the Invention

From the above-mentioned, a liquid crystal display apparatus having a large displacement amount in a minute load range without generating the gravity mura or low temperature bubbles, or the like; having a sufficient strength also against a local load; and furthermore, capable of constantly producing a gap between the transparent substrates, is called for.

Means for Solving the Problem

The present invention provides a liquid crystal display apparatus comprising at least two sheets of transparent substrates, a liquid crystal layer sealed between the two sheets of transparent substrates, and a plurality of columnar spacers formed between the two sheets of transparent substrates for keeping the gap between the two sheets of transparent substrates at a specified gap, characterized in that the displacement amount between the 80 mN to 400 mN load is in a range of 0.1 µm to 0.8 µm, and the displacement amount between the 600 mN to 950 mN load is in a range of 0.05 µm to 0.5 µm at the time of applying a load by the below-mentioned measurement method in the direction so as to reduce the gap between the two sheets of transparent substrates to the display area of the transparent substrates.

(Measurement Method)

The deformation amount against a load is measured by applying a load in the vertical direction to the transparent substrate surface with an indenter having a 2 mmφ plane by a 2.22 mN/sec applied load contacted with either of the transparent substrate side under the 23° C. condition.

According to the present invention, when a relatively small load and a relatively large load are applied to the liquid crystal display apparatus by the above-mentioned method, since each displacement amount can be within the range, a liquid crystal display apparatus capable of having a large displacement amount against a relatively small load and the strength against a relatively large load can be provided. Thereby, a liquid crystal display apparatus without the gravity mura, the low temperature bubbles, or the like; having a sufficient strength against a local load; and capable of constantly producing a gap between the transparent substrates can be provided.

The present invention also provides a liquid crystal display apparatus comprising at least two sheets of transparent substrates, a liquid crystal layer sealed between the two sheets of transparent substrates, and a plurality of columnar spacers formed between the two sheets of transparent substrates for keeping the gap between the two sheets of transparent substrates at a specified gap, characterized in that with the premise that the displacement amount between the 80 mN to 400 mN load is 100, the displacement amount between the 600 mN to 950 mN load is in a range of 30 to 200 at the time of applying a load by the below-mentioned measurement method in the direction so as to reduce the gap between the two sheets of transparent substrates to the display area of the transparent substrates.

(Measurement Method)

The deformation amount against a load is measured by applying a load in the vertical direction to the transparent substrate surface with an indenter having a 2 mmφ plane by a 2.22 mN/sec applied load contacted with either of the transparent substrate side under the 23° C. condition.

According to the present invention, since the displacement amount ratio against the loads in the respective ranges can be within the range, a liquid crystal display apparatus capable of having a large displacement amount against a relatively small load and the strength against a relatively large load can be provided. Thereby, a liquid crystal display apparatus without the gravity mura, the low temperature bubbles, or the like; having a sufficient strength against a local load; and capable of constantly producing a gap between the transparent substrates can be provided.

In the invention mentioned above, the plurality of columnar spacers formed so as to be distributed homogenously in the display area can be at least two kinds of columnar spacers having different heights. In this case, when a relatively small load is applied to the liquid crystal display apparatus, since the load is supported only by a high columnar spacer, the displacement amount can be made larger. On the other hand, when a relatively large load is applied, since the load is supported by a high columnar spacer and a low columnar spacer, the further displacement can be restrained so that a liquid crystal display apparatus having the above-mentioned characteristic can be provided.

At the time, at least the two kinds of the columnar spacers having different heights can be formed with one kind of material such that the height difference as the columnar spacers can be provided in accordance with the presence or absence of a pedestal or by the height difference of the pedestal. This is because, even when the heights of the columnar spacers alone are equal, the heights of the columnar spacers can be made different by the use of the pedestal so that the columnar spacers can be formed efficiently.

In the present invention, the pedestal is formed of at least one kind of layer selected from the group consisting of a colored layer, a light shielding layer and an overcoat layer. Since the pedestal is formed with any of the layers, the pedestal can be formed simultaneously at the time of forming the layers so that a liquid crystal display apparatus can be formed efficiently.

Further, in the present invention, at least the two kinds of the columnar spacers having different heights can be formed with at least two kinds of materials having different hardness such that a lower hardness material is used for a higher columnar spacer. Thereby, the deformation amount of a high columnar spacer can be made larger and the deformation amount of a low columnar spacer can be made smaller so that a liquid crystal display apparatus having the above-mentioned characteristic can be provided.

Furthermore, in the present invention, the at least two kinds of the columnar spacers having different heights have at least two kinds of shapes with different upper bottom surface areas such that a higher columnar space is formed so as to have a smaller upper bottom surface area. Thereby, the deformation amount of a high columnar spacer can be made larger and the deformation amount of a low columnar spacer can be made smaller so that a liquid crystal display apparatus having the above-mentioned characteristic can be provided.

In the present invention, it is preferable that the height difference between the highest columnar space and the lowest columnar space of the at least two kinds of the columnar spacers having different heights is in a range of 0.02 µm 0.5 µm. Thereby, a liquid crystal display apparatus having the displacement amount against the load can be provided.

Moreover, in the present invention, the plurality of columnar spacers formed in the display area is provided by laminating two kinds of materials having the same height and different hardness. For example, by providing the upper part of the columnar spacer with a low hardness material and the lower part of the columnar spacer with a high hardness material, or the like, a liquid crystal display apparatus having the above-mentioned characteristic can be provided.

Effect of the Invention

According to the present invention, when a relatively small load and a relatively large load are applied to the liquid crystal display apparatus by the above-mentioned method, since each displacement amount can be within the range, a liquid crystal display apparatus capable of having a large displacement amount against a relatively small load and the strength against a relatively large load can be provided. Thereby, a liquid crystal display apparatus without the gravity mura, the low temperature bubbles, or the like; having a sufficient strength against a local load; and capable of constantly producing a gap between the transparent substrates can be provided.

EXPLANATION OF REFERENCE

1 . . . transparent substrate
2 . . . liquid crystal layer
3 . . . columnar spacer

BEST MODE FOR CARRYING OUT THE INVENTION

The present invention relates to a liquid crystal display apparatus having an excellent display quality and capable of keeping an even cell gap. Hereinafter, the liquid crystal display apparatus of the present invention will be explained in detail.

Figure 1:
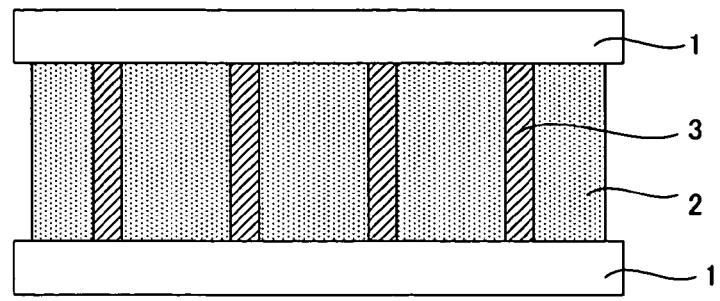
FIG. 1 is a schematic cross-sectional view showing an example of a liquid crystal display apparatus of the present invention.

The liquid crystal display apparatus of the present invention includes two embodiments according to its displacement amount against the load. In either embodiment, for example as shown in FIG. 1, the liquid crystal display apparatus comprises two sheets of transparent substrates 1, a liquid crystal layer 2 sealed between the transparent substrates 1, and columnar spacers 3 for keeping the transparent substrates 1 constant.

Hereinafter, each embodiment will be explained separately.

A. FIRST EMBODIMENT

Firstly, the first embodiment of the present invention will be explained. The first embodiment of the liquid crystal display apparatus of the present invention is a liquid crystal display apparatus comprising at least two sheets of transparent substrates, a liquid crystal layer sealed between the two sheets of transparent substrates, and a plurality of columnar spacers formed between the two sheets of transparent substrates, for keeping the gap between the two sheets of transparent substrates at a specified gap, characterized in that a predetermined displacement amount as described below is shown in a relatively small load region and a relatively large load region at the time of applying a load by a predetermined measurement method in the direction such that the gap between the two sheets of transparent substrates is reduced in the display area of the two sheets of transparent substrates.

According to this embodiment, since the load and the displacement amount have the relationship as described below, when a relatively small load is applied to the liquid crystal display apparatus, the displacement amount of the liquid crystal display apparatus can be made larger; and moreover, when a relatively large load is applied, the strength can be provided to the force, that is, further displacement beyond a certain level can be restrained. The above-mentioned display area denotes a region to be used as a display part of a liquid crystal display apparatus.

Here, as to the relationship between the load and the displacement amount, it is preferable that the displacement amount between the 80 mN to 400 mN load is in a range of 0.1 μm to 0.8 μm, in particular, in a range of 0.2 μm to 0.4 μm; and the displacement amount between the 60 mN to 950 mN load is in a range of 0.05 μm to 0.5 μm, in particular, in a range of 0.05 μm to 0.3 μm.

The above-mentioned displacement amount is a value obtained by measuring the deformation amount against a load which is measured by applying a load in the vertical direction to the transparent substrate surface with an indenter having a 2 mmφ plane by a 2.22 mN/sec applied load contacted with either of the transparent substrate side under the 23° C. condition.

As the testing machine used for the measurement, one capable of accurately measuring the compression load and the displacement amount can be used. Specifically, as to the displacement amount, the deformation amount of the columnar spacer at the time of applying a load between 80 mN and 400 mN using the below-mentioned indenter at a loading speed of 2.22 mN/sec in the columnar spacer axial direction under the 23° C. condition with a 2 mmφ metal piece contacted with either of the transparent substrates is measured. By calculating the difference between the largest deformation amount of the columnar spacer and the smallest deformation amount in this range, the displacement amount in the range can be obtained. The above-mentioned displacement amount between 600 mN to 950 mN can also be obtained in the same manner. As to the indenter, Fiscer Scope H-100 manufactured by Fischer Instruments KK (Using an indenter having a 100 μm×100 μm plane by polishing the head part of Vickers indenter (quadrangular pyramid-like)) can be used.

Hereinafter, each configuration of this embodiment will be explained in detail.

1. Columnar Spacer

First, the columnar spacer used in this embedment will be explained. The columnar spacer used in this embodiment is formed for keeping the gap between the two sheets of transparent substrates to be described later at a specified gap so that the film thickness of the liquid crystal layer is determined by the height of the columnar spacer. Therefore, depending on the displacement amount of the columnar spacer against a load, the displacement amount of the liquid crystal display apparatus against a load is determined.

The columnar spacer used in this embodiment is not particularly limited as long as it can keep the gap between the transparent substrates constant so as to perform the displace amount against a load mentioned above. For example, one kind of a columnar spacer made of a material having the above-mentioned relationship between the load and the displacement amount may be used.

In this embodiment, among the above-mentioned cases, the case of using at least two kinds of columnar spacers having different heights (hereinafter, referred to as the first embodiment), and the case of using a columnar spacer with two kinds of materials having the same height and different hardness laminated (hereinafter it will be referred to as the second embodiment) are preferable. This is because the characteristics concerning the load and the displacement amount mentioned above can easily be realized by using the materials of different heights and kinds; and furthermore, it is also preferable in terms of the material design convenience, the cost, or the like. Hereinafter, each embodiment mentioned above will be explained.

a. First Embodiment

Figure 2A:
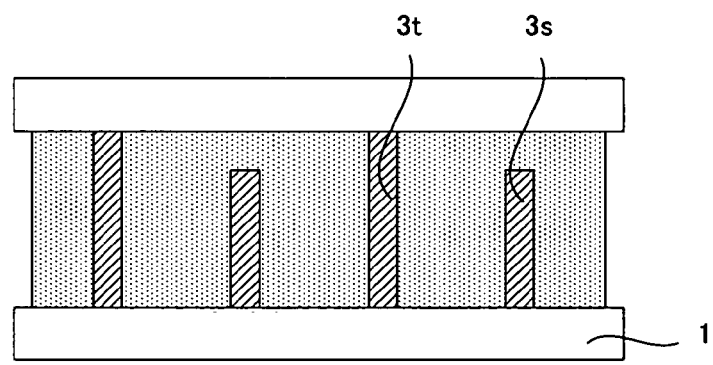
FIGS. 2A to 2C is an explanatory diagram showing an example of a liquid crystal display apparatus of the present invention.
Figure 2B:
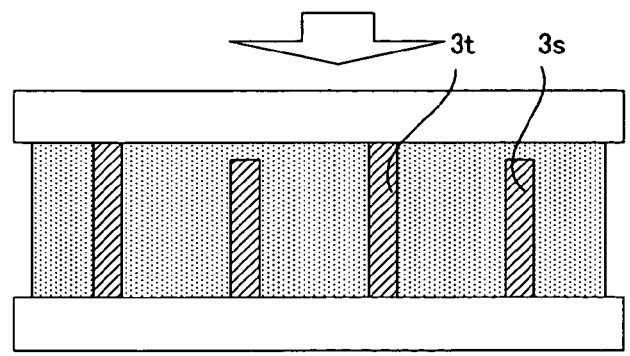

Firstly, the first embodiment of the columnar spacer of this embodiment will be explained. The first embodiment of the columnar spacer of this embodiment is the case of using at least two kinds of columnar spacers ($3s$ and $3t$) having different heights as the columnar spacer 3 for example as shown in FIG. 2A. According to this embodiment, when a relatively small load is applied to the liquid crystal display apparatus, for example as shown in FIG. 2B, the load is supported only by the high columnar spacers $3t$. Therefore, the resistance against the load is small so that the displacement amount of the liquid crystal display apparatus against the load becomes larger.

Figure 2C:
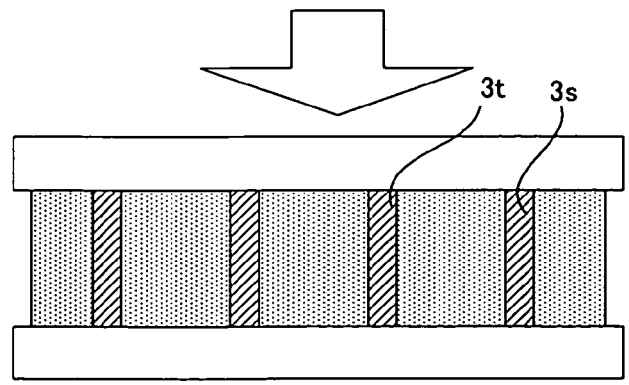

On the other hand, when a relatively large load is applied to the liquid crystal display apparatus, for example as shown in FIG. 2C, the load is supported by the high columnar spacers $3t$ and the low columnar spacers $3s$. Therefore, compared with the above-mentioned case, since the load is supported by a large number of the columnar spacers ($3t$ and $3s$), the resistance against the load is large. Thereby, displacement of the liquid crystal display apparatus downward of the low columnar spacers $3s$ can hardly be generated so that the further displacement of the liquid crystal display apparatus can be reduced.

Here, the columnar spacers having different heights may be formed at least two kinds of heights, and thus they may be formed so as to have three or more kinds of heights. When the columnar spacers are formed so as to have three or more kinds of heights, the relationship between the load and the displacement amount of the liquid crystal display apparatus can be adjusted further stepwise.

Here, the columnar spacers are formed evenly in the display area of the liquid crystal display apparatus. The number of the columnar spacers to be formed can be suitably selected according to the kind of the liquid crystal display apparatus, or the like. In general, it is formed in the display area of the liquid crystal display apparatus in a range of 8 pieces/mm$^2$ to 50 pieces/mm$^2$.

At the time, for example in the case of two kinds of spacers having different heights, it is preferable to form the high columnar spacers in a range of 2 pieces/mm$^2$ to 20 pieces/mm$^2$; in particular, it is preferable to form the same in a range of 2 pieces/mm$^2$ to 10 pieces/mm$^2$. On the other hand, it is preferable to form the low columnar spacers in a range of 10 pieces/mm$^2$ to 40 pieces/mm$^2$.

Moreover, the height of the columnar spacers formed in this embodiment can be suitably selected according to the kind of the liquid crystal display apparatus, or the like and thus it is not particularly limited. The height difference between the highest columnar spacers and the lowest columnar spacers is in a range of 0.02 µm to 0.5 µm, preferably in a range of 0.02 µm to 0.2 µm.

The above-mentioned columnar spacers having two or more kinds of heights may be formed either with one kind of material or two or more kinds of materials.

Figure 3:
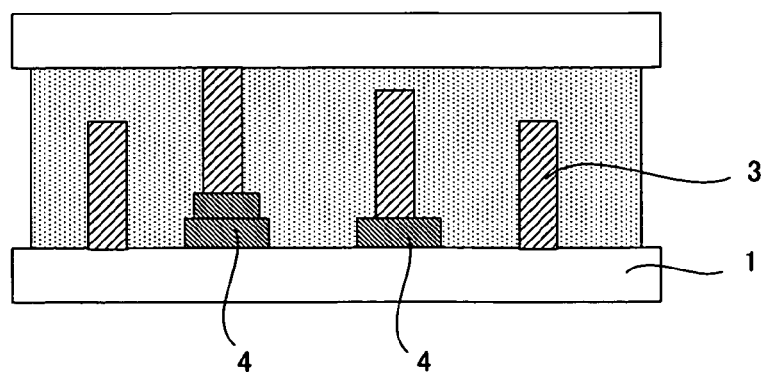
FIG. 3 is a schematic cross-sectional view showing another example of a liquid crystal display apparatus of the present invention.

When the columnar spacers having different heights are formed with one kind of material, the displacement amount against a load is determined according to the height difference of the columnar spacers. As to the method for forming such a columnar spacer, for example as shown in FIG. 2A, the columnar spacers 3 each having different heights may be formed between the two sheets of transparent substrates 1 to be described later; however, for example as shown in FIG. 3, it is preferable to form pedestals 4 on the transparent substrate 1 after forming the columnar spacers 3 having the same height in a plurality so as to dispose the columnar spacers 3 on the pedestals 4 for providing the height difference as the columnar spacers according to the height difference of the pedestals 4 or presence or absence of the pedestals 4. Thereby, the height adjustment of the columnar spacers can be facilitated, and furthermore, formation of the columnar spacers can be facilitated.

At the time, the kind of the pedestals is not particularly limited as long as the height of the columnar spacers can be adjusted. In particular, it is preferable to form the same with at least one layer selected from the group consisting of the colored layer, the light shielding layer and the overcoat layer to be used in the liquid crystal display apparatus. Thereby, the pedestals can be formed simultaneously at the time of forming the colored layer, or the like so that the liquid crystal display apparatus can be formed efficiently. Here, when the colored layer is used as the pedestal, the columnar spacers having a plurality of heights can be formed by using for example a pedestal made of a blue colored layer; a pedestal made of a blue colored layer and a green colored layer; and a pedestal made of a blue colored layer, a green colored layer and a red colored layer, or the like.

Figure 4:
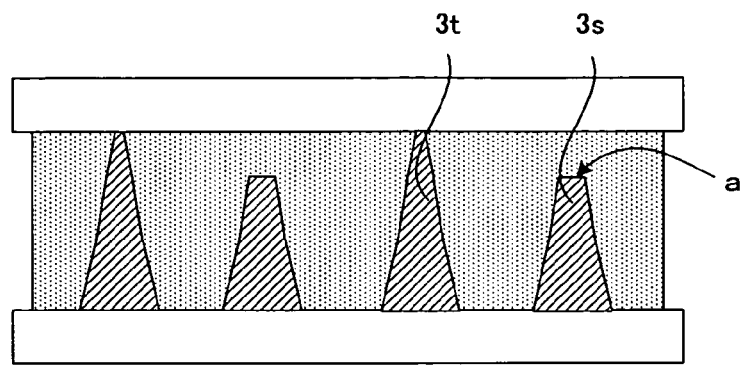
FIG. 4 is a schematic cross-sectional view showing another example of a liquid crystal display apparatus of the present invention.

Moreover, the shape of the columnar spacers is not particularly limited as long as it is a shape capable of keeping the gap between the transparent substrates constant. It may be for example cylindrical, prism-like, conical or pyramid-like with the vertex part cut off, or the like. Moreover, the shape of the high columnar spacers and the low columnar spacers may be same; however, in this embodiment, for example as shown in FIG. 4, it is preferable to form the higher columnar spacers 3 with a smaller upper bottom surface (portion shown by a in FIG. 4) area. Thereby, when a small load is applied to the liquid crystal display apparatus, the load applied on the upper bottom surface of the high columnar spacer becomes larger so as to increase the displacement amount of the liquid crystal display apparatus. Moreover, when a large load is applied to the liquid crystal display apparatus, since the load is supported by the wide upper bottom surface of the low columnar spacers so as to disperse the load, deformation of the low columnar spacers can be reduced.

On the other hand, when the columnar spacers having different heights are formed by two or more kinds of materials, the displacement amount against a load is determined according to the height difference of the columnar spacers, the hardness of the materials, or the like. In this case, it is preferable that the higher columnar spacer is made of a low hardness material. Thereby, in the case of a relatively small force, the load is supported by the columnar spacer formed by a low hardness material so as to increase the displacement amount. Moreover, in the case of a relatively large force, the load is supported by the columnar spacers formed by a high hardness material so as to provide the strength against a large load.

Moreover, in this case, at least one of the spacers may be formed with at least one layer selected from the group consisting of the colored layer, the light shielding layer and the overcoat layer to be used in the liquid crystal display apparatus.

For example, the low spacer may be one as a single layer of a colored layer formed with a high hardness material or one prepared by laminating the same in a plurality and the high spacer formed with the overcoat layer. Moreover, when a large difference of hardness is desired, a low hardness columnar spacer forming material may be prepared separately so as to form the high spacer.

Moreover, the shape of the columnar spacer is not particularly limited as long as it is a shape capable of keeping the gap between the transparent substrates constant so that as mentioned above, it may be cylindrical, prism-like, conical or pyramid-like with the vertex part cut off, or the like. Moreover, the shape of the higher columnar spacers and low columnar spacers may be same. Also in this case, it is preferable that a higher columnar spacer is formed with a smaller upper bottom surface area.

Here, the material used for the columnar spacers of this embodiment is not particularly limited as log as it has the characteristics both in the above-mentioned cases. As an example there of, the following can be presented. When the columnar spacers are formed with the above-mentioned two or more kinds of materials, two or more kinds of material can be selected and used suitably from the following materials, or the like.

The above-mentioned columnar spacers can be formed using in general a photosetting resin composition. As the photosetting resin composition, a composition containing at least a polyfunctional acrylate monomer, a polymer and a photo polymerization-initiating agent can be used preferably.

As the polyfunctional acrylate monomer to be contained in the photosetting resin composition, a compound having two or more ethylenic unsaturated bonds containing group such as an acrylic group and a methacrylic group is used. Specifically, an ethylene glycol (meth)acrylate, a diethylene glycol di(meth)acrylate, a propylene glycol di(meth)acrylate, a dipropylene glycol di(meth)acrylate, a polyethylene glycol di(meth)acrylate, a polypropylene glycol di(meth)acrylate, a hexane di(meth)acrylate, a neopenthyl glycol di(meth)acrylate, a glycerol di(meth)acrylate, a glycerol tri (meth) acrylate, a trimethylol propane tri (meth) acrylate, a 1,4-butane diol diacrylate, a pentaerythritol (meth)acrylate, a pentaerythritol tri(meth)acrylate, a pentaerythritol tetra(meth) acrylate, a dipentaerythritol hexa (meth) acrylate, a dipentaerythritol penta (meth) acrylate or the like can be presented as an example.

The polyfunctional acrylate monomers may be used as a combination of two or more kinds. In this embodiment, a (meth)acrylic denotes either of an acryl or a methacryl, and a (meth)acrylate denotes either of an acrylate group or a methacrylate.

In this embodiment, it is preferable that the content of such a polyfunctional acrylate monomer is 50% by weight or more with respect to the total solid content of the photosetting resin composition. Here, the total solid content is the total amount of the all components other than the solvent so that a liquid monomer component is included therein.

It is preferable that the polyfunctional acrylate monomer includes a monomer having a tri- or more functional ethylenically unsaturated bond, and it is preferable that the content thereof accounts for about 30 to 95% by weight of the use amount of the polyfunctional acrylate monomer.

When the content of the polyfunctional acrylate monomer in the photosetting resin composition is increased, the columnar spacers having the above-mentioned physical properties can be formed in a wide temperature range. However, on the other hand, a preferably developing property can hardly be obtained so that the troubles such as that the pattern edge shape accuracy is deteriorated and disability in obtaining a desired shape can easily be generated. The reason thereof is presumed that even though the hardness can be improved owing to the extremely high cross linking density after curing by including a large amount of a polyfunctional acrylate monomer in the photosetting resin composition, the solubility at the time of the development is too low so as to be disadvantageous in terms of obtaining a preferable developing property.

In order to solve the problems, it is preferable to use a tri- or more functional polyfunctional acrylate monomer having one or more acidic group and three or more ethylenically unsaturated bonds in a molecule (hereinafter, it is referred to as a "tri- or more functional acidic polyfunctional acrylate monomer").

The tri- or more functional acidic polyfunctional acrylate monomer has a role of improving the cross linking density of the resin composition and a role of improving the alkaline developing property. Therefore, in the case of forming a columnar spacer using a resin composition containing the acidic polyfunctional acrylate monomer, the edge shape of the columnar spacer becomes preferable, and furthermore, the columnar spacer of a desired shape can easily be formed. Furthermore, a columnar spacer having the excellent elastic deformation ratio at a room temperature, in particular, a sufficient hardness to be hardly plastically deformed at the time of cell pressing of the liquid crystal panel or at the time of handling thereafter, and a flexibility capable of following the thermal contraction and expansion of the liquid crystal can be formed.

The acidic group of the acidic polyfunctional acrylate monomer may be one capable of alkaline development. For example, a carboxyl group, a sulfonic acid group, a phosphoric acid group, or the like can be presented. In terms of the alkaline developing property and the resin composition handling property, a carboxyl group is preferable.

As the tri- or more functional acidic polyfunctional acrylate monomer as mentioned above, (1) a polyfunctional (meth) acrylate with a carboxyl group introduced by modifying a hydroxyl group containing polyfunctional (meth)acrylate with a dibasic acid anhydride, or (2) a polyfunctional (meth)acrylate with a sulfonic acid introduced by modifying an aromatic polyfunctional (meth) acrylate with a concentrated sulfuric acid or a fuming sulfuric acid, or the like can be used.

As the tri- or more functional acidic polyfunctional acrylate monomer, those represented by the following general formulae (1) and (2) are preferable.

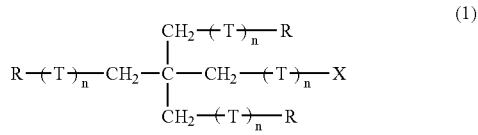
(1)

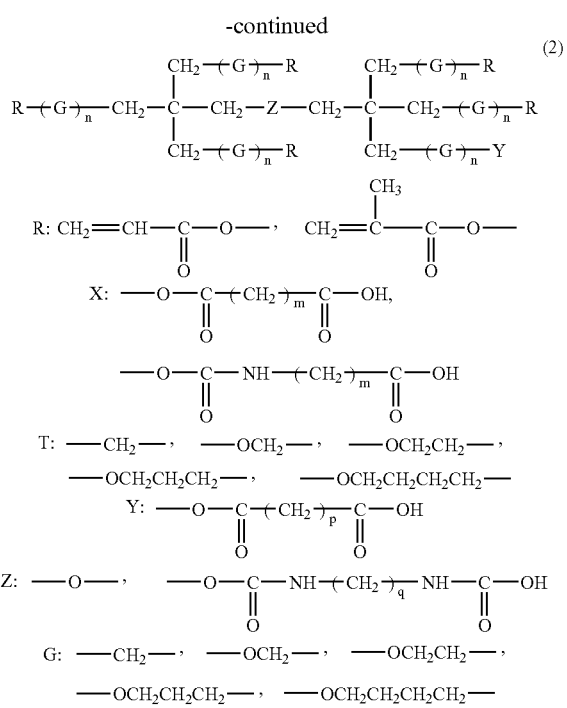

(In the formula (1), n is 0 to 14, and m is 1 to 8. In the formula (2), R is same as in the formula (1), n is 0 to 14, p is 1 to 8, and q is 1 to 8. R, T, G present in a plurality in one molecule may either be same or different respectively.)

As the acidic polyfunctional acrylate monomer represented by the formulae (1) and (2), specifically, TO-756 as a trifunctional acrylate containing a carboxyl group, TO-1382 as a pentafunctional acrylate containing a carboxyl group manufactured by TOA GOSEI CO., LTD. can be presented.

As the polymer to be contained in the photosetting resin composition, an ethylene-vinyl acetate copolymer, an ethylene-vinyl chloride copolymer, an ethylene-vinyl copolymer, a polystyrene, an acrylonitrile-styrene copolymer, a ABS resin, a polymethacrylic acid resin, an ethylene-methacrylic acid resin, a polyvinyl chloride resin, a chlorinated vinyl chloride, a polyvinyl alcohol, a cellulose acetate propionate, a cellulose acetate butylate, a nylon 6, a nylon 66, a nylon 12, a polyethylene terephthalate, a polybutylene terephthalate, a polycarbonate, a polyvinyl acetal, a polyether ether ketone, a polyether sulfone, a polyphenylene sulfide, a polyallylate, a polyvinyl butylal, an epoxy resin, a phenoxy resin, a polyimide resin, a polyamide imide resin, a polyamic acid resin, a polyether imide resin, a phenol resin, a urea resin, or the like can be presented as an example.

Furthermore, as the polymer, a polymer or a copolymer comprising one or more kinds selected from the group consisting of a methyl (meth)acrylate, an ethyl (meth)acrylate, a n-propyl (meth)acrylate, an isopropyl (meth)acrylate, a sec-butyl (meth)acrylate, an isobutyl (meth)acrylate, a tert-butyl (meth)acrylate, a n-pentyl (meth)acrylate, a n-hexyl (meth) acrylate, a 2-ethyl hexyl (meth)acrylate, a n-octyl (meth) acrylate, a n-decyl (meth) acrylate, a styrene, an α-methyl styrene, a N-vinyl-2-pyrolidone as a polymerizable monomer and a glycidyl (meth)acrylate, and one or more kinds selected from the group consisting of a dimer of a (meth) acrylic acid and an acrylic acid (such as M-5600 manufactured by TOA GOSEI CO., LTD.), an itaconic acid, a crotonic acid, a maleic acid, a fumaric acid, a vinyl acetate and an anhydride thereof can also be presented. Moreover, a polymer produced by adding an ethylenically unsaturated compound having a glycidyl group or a hydroxyl group to the copolymer, or the like can also be presented, but it is not limited thereto.

Among the polymer examples, since a polymer containing an ethylenically unsaturated bond forms a cross linking bond with a monomer so as to obtain the excellent strength, it can be used particularly preferably.

The content of such a polymer is preferably 10 to 40% by weight with respect to the total solid content of the photosetting resin composition.

As the photo polymerization initiating agent to be included in the photosetting resin composition, a photo radical polymerization initiating agent to be activated by a ultraviolet ray, an ionizing radiation, a visible light, or an energy line of the other wavelengths, in particular, 365 nm or less can be used. As such a photo polymerization initiating agent, specifically, a benzophenone, an o-benzoyl methyl benzoate, a 4,4-bis (dimethyl amine) benzophenone, a 4,4-bis (diethyl amine) benzophenone, an α-amino-acetophenone, a 4,4-dichlorobenzophenone, a 4-benzoyl-4-methyl diphenyl ketone, a dibenzyl ketone, a fluolenone, a 2,2-diethoxy acetophenone, a 2,2-dimethoxy-2-phenyl acetophenone, a 2-hydroxy-2-methyl propiophenone, a p-tert-butyl dichloroacetophenone, a thioxantone, a 2-methyl thioxantone, a 2-chlorothioxantone, a 2-isopropyl thioxantone, a diethyl thioxantone, a benzyl dimethyl ketal, abenzylmethoxy ethyl acetal, abenzoinmethyl ether, a benzoin butyl ether, an anthraquinone, a 2-tert-butyl anthraquinone, a 2-amyl anthraquinone, a β-chloranthraquinone, an anthrone, a benzanthrone, a dibenzsuberone, a methylene anthrone, a 4-adidobenzyl acetophenone, a 2,6-bis (p-adidobendilidene) cyclohexane, a 2,6-bis (p-adidobendilidene)-4-methyl cyclohexanone, a 2-phenyl-1,2-butadion-2-(o-methoxy carbonyl) oxime, a 1-phenyl-propane dion-2-(o-ethoxy carbonyl) oxime, a 1,3-diphenyl-propane trion-2-(o-ethoxy carbonyl) oxime, a 1-phenyl 3-ethoxy-propane trion-2-(o-benzoyl) oxime, a Michler's ketone, a 2-methyl-1[4-(methyl thio) phenyl]-2-morpholino propane-1-on, a 2-benzyl-2-dimethyl amino-1-(4-morpholino phenyl)-butanone, a naphthalene sulfonyl chloride, a quinoline sulfonyl chloride, a n-phenyl thioacrydone, a 4,4-azo bis isobuthylonitrile, a diphenyl disulfide, a benzthiazol disulfide, a triphenyl phosphine, a camphor quinone, N1717 manufactured by Asahi Denka Co., Ltd. a carbon tetrabromate, a tribromo phenyl sulfone, a benzoin peroxide, an eosin, a combination of a photo reducing pigment such as a methylene blue and a reducing agent such as an ascorbic acid and a triethanol amine, or the like can be presented as an example. In this embodiment, these photo polymerization-initiating agents can be used alone or as a combination of two or more kinds.

The content of such a photo polymerization-initiating agent is preferably 2 to 20% by weight with respect to the total solid content of the photosetting resin composition.

The photosetting resin composition may contain as needed a component other than the polyfunctional acrylate monomer, the polymer and the photo polymerization-initiating agent. For example, for the purpose of improving the heat resistance, the adhesion property and the chemical resistance (in particular, the alkaline resistance), an epoxy resin may be contained in the photosetting resin composition. As the epoxy resin to be used, the product name EPICOAT series manufactured by Japan Epoxy Resins Co., Ltd., the product name CELOXIDE series and EPOLEAD series manufactured by DAICEL CHEMICAL INDUSTRIES, LTD. can be presented as an example. As the epoxy resin, furthermore, a bisphenol A type epoxy resin, a bisphenol F type epoxy resin, a bisphenol S type epoxy resin, a novolak type epoxy resin, a polycarboxylic acid glycidyl ester, a polyol glycidyl ester, an aliphatic or alicyclic epoxy resin, an amine epoxy resin, a triphenol methane type epoxy resin, a dihydroxy benzene type epoxy resin, and a copolymer epoxy compound of a glycidyl (meth)acrylate and a radically polymerizable monomer, or the like can be presented as an example. In this embodiment, these epoxy resins can be used alone or as a combination of two or more kinds.

The content of such an epoxy resin is preferably 0 to 10% by weight with respect to the total solid content of the photosetting resin composition.

In general, a solvent is contained in the photosetting resin composition for adjusting the coating suitability for spin coating, or the like by dissolving and dispersing a solid content. As to the solvent, it is preferable to use a solvent having a relatively high boiling point for having a preferable dissolving property or dispersing property with respect to a contained component such as a monomer, a polymer and a photo polymerization-initiating agent and a preferable spin coating property. By using such a solving, the solid content concentration is adjusted in general to 5 to 50% by weight.

For preparing the setting resin composition, a polyfunctional acrylate monomer, a polymer, a photo polymerization initiating agent and, as needed, other components are introduced into an appropriate solvent so as to be dissolved and dispersed by a ordinary method such as a paint shaker, a bead mill, a sand grind mill, a ball mill, an atriter mill, a two bar roll mill, and a three bar roll mill.

The method for producing the columnar spacer in this embodiment is not particularly limited so that it can be produced by a production method commonly used in general in this field; specifically, a production method of coating the composition with a spin coater, patterning by a photolithography method and curing, or the like can be used.

b. Second Embodiment

Next, the second embodiment of the columnar spacer used in this embodiment will be explained. The second embodiment of the columnar spacer used in this embodiment is the case of using columnar spacers comprising two different kinds of materials having the same height and different hardness laminated thereon.

Figure 5:
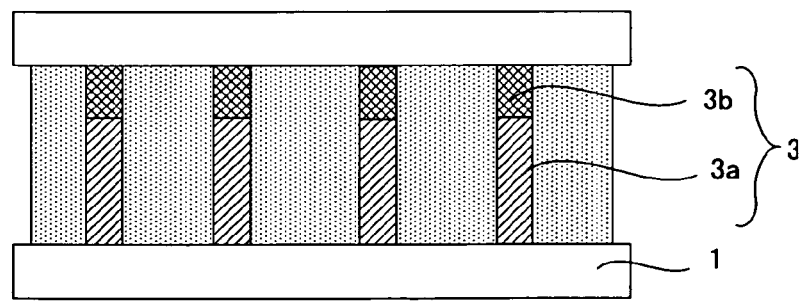
FIG. 5 is a schematic cross-sectional view showing another example of a liquid crystal display apparatus of the present invention.

For example, as shown in FIG. 5, the columnar spacers of this embodiment are provided as the columnar spacers 3 by laminating the materials 3a and 3b having the same height and different hardness. According to this embodiment, for example, when the upper part of the columnar spacers is provided as a low hardness part formed with a low hardness material and the lower part as a high hardness part formed with a high hardness material, when a relatively small load is applied to the liquid crystal display apparatus, the low hardness part is deformed so that the displacement amount can be made larger. On the other hand, when a relatively large load is applied to the liquid crystal display apparatus, further deformation of the columnar spacer is prevented by the high hardness part so that the strength can be provided against a large load.

Figure 6:
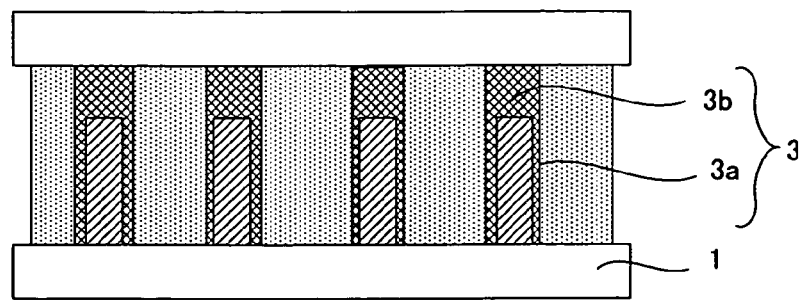
FIG. 6 is a schematic cross-sectional view showing another example of a liquid crystal display apparatus of the present invention.
Figure 7:
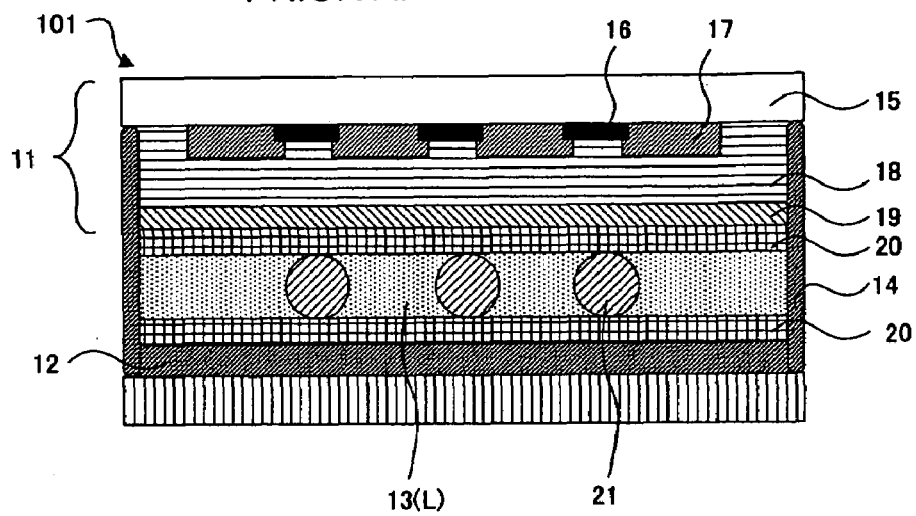
FIG. 7 is a schematic cross-sectional view showing a conventional liquid crystal display apparatus.
Figure 8:
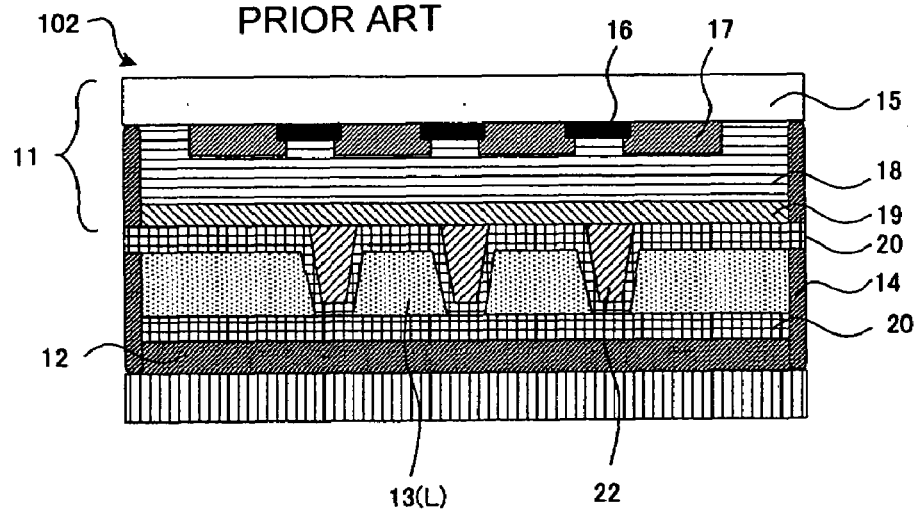
FIG. 8 is a schematic cross-sectional view showing a conventional liquid crystal display apparatus.

The shape, or the like of such a columnar spacer is not particularly limited as long as the relationship between the load and the displacement amount as mentioned above can be satisfied. For example, the upper part of the columnar spacers may be provided as the low hardness part and the lower part as the high hardness part. Moreover, for example as shown in FIG. 6, it may be a columnar spacer 3 with the high hardness part 3a formed in the low hardness part 3b, or the like.

Moreover, at least one of the high hardness part and the low hardness part may be formed of at least one layer selected from the group consisting of the colored layer, the light shielding part and the overcoat layer to be used for the liquid crystal display apparatus.

Since the material or the columnar spacer, the height to be formed, or the like in this embodiment are same as those in the above-mentioned first embodiment, explanation is omitted here.

2. Liquid Crystal Layer

Next, the liquid crystal layer used in this embodiment will be explained. The liquid crystal layer used in this embodiment is sealed between the two sheets of transparent substrates to be described later so that display of the liquid crystal display apparatus can be carried out by adjusting the light transmittance of the liquid crystal layer or by other means. In this embodiment, since a liquid crystal layer used in an ordinary liquid crystal display apparatus can be used as the liquid crystal layer, detailed explanation is omitted here.

3. Transparent Substrate

Next, the transparent substrate used in this embodiment will be explained. The transparent substrate used in this embodiment is not particularly limited as long as it can be used for a liquid crystal display apparatus; and a transparent rigid material without flexibility such as a quartz glass, a Pyrex (registered trademark) glass and a synthetic quartz plate, or a transparent flexible material having the flexibility such as a transparent resin film and an optical resin plate can be used. Moreover, two sheets of transparent substrates are used for the liquid crystal display apparatus, and in general one of the two sheets of transparent substrates is provided as the display side substrate and the other one is used as the liquid crystal driving side substrate.

4. Liquid Crystal Display Apparatus

Next, the liquid crystal display apparatus of this embodiment will be explained. The liquid crystal display apparatus of this embodiment is not particularly limited as long as it comprises the transparent substrates, the liquid crystal layer and the columnar spacers mentioned above.

In this embodiment, the columnar spacers may either be formed on the display side substrate or be formed on the liquid crystal driving side substrate. Moreover, although the liquid crystal display apparatus of this embodiment is not particularly limited, it is preferably a color liquid crystal display apparatus.

The liquid crystal display apparatus of this embodiment may have various necessary functional layers such as a colored layer, an overcoat layer and a light shielding layer, other than the transparent substrates, the liquid crystal layer and the columnar spacers. These functional layers maybe selected and formed suitably according to the kind of the substrate to have the columnar spacers. Moreover, each functional layer may be formed on the transparent substrate with the columnar spacers formed thereon or it may be formed on the columnar spacers.

B. SECOND EMBODIMENT

Next, the second embodiment of the present invention will be explained. The second embodiment of the liquid crystal display apparatus of the present invention is a liquid crystal display apparatus comprising at least two sheets of transparent substrates, a liquid crystal layer sealed between the two sheets of transparent substrates, and a plurality of columnar spacers formed between the two sheets of transparent substrates, for keeping the gap between the two sheets of transparent substrates at a specified gap, characterized in that a predetermined ratio of displacement amount as described below is shown at the time of applying a load by a measurement method described below in the direction such that the gap between the two sheets of transparent substrates is reduced in the display area of the two sheets of transparent substrates.

According to this embodiment, since the load and the displacement amount have the relationship as described below, when a relatively small load is applied to the liquid crystal display apparatus, the displacement amount of the liquid crystal display apparatus can be made larger; and moreover, when a relatively large load is applied, the strength can be provided to the load, that is, further displacement beyond a certain level is reduced.

Here, as to the relationship between the load and the displacement amount, specifically, with the premise that the displacement amount between the 80 mN to 400 mN load is 100, the displacement amount between the 600 mN to 950 mN load is in a range of 30 to 200; more preferably in a range of 40 to 120; and particularly preferably in a range of 40 to 100. The displacement amount is the value measured by the same method as the measurement method of the above-mentioned first embodiment.

Since the liquid crystal display apparatus having such characteristics can be realized by the use of the same columnar spacers, liquid crystal layer and transparent substrates as in the above-mentioned first embodiment, detailed explanation thereof is omitted here.

Moreover, the liquid crystal display apparatus of this embodiment is not particularly limited as long as it comprises the transparent substrates, the liquid crystal layer and the columnar spacers mentioned above.

Also in this embodiment, the columnar spacers may be formed either on the display side substrate or on the liquid crystal driving side substrate. Moreover, although the liquid crystal display apparatus of this embodiment is not particularly limited, it is preferably a color liquid crystal display apparatus.

The liquid crystal display apparatus of this embodiment may have various necessary functional layers such as a colored layer, an overcoat layer and a light shielding layer, other than the transparent substrates, the liquid crystal layer and the columnar spacers. These functional layers maybe selected and formed suitably according to the kind of the substrate to have the columnar spacers. Moreover, each functional layer may be formed on the transparent substrate with the columnar spacers formed thereon or it may be formed on the columnar spacers.

The present invention is not limited to the above-mentioned embodiments. The above-mentioned embodiments are examples and any one substantially having the same configuration as the technological idea disclosed in the claims of the present invention so as to achieve the same effects is included in the technological scope of the present invention.

EXAMPLES

Example 1

(Preparation of the Copolymer Resin Composition)

Placed were 63 parts by weight of a methyl metahcrylate (MMA), 12 parts by weight of an acrylic acid (AA), 6 parts by weight of a methacrylic acid-2-hydroxy ethyl (HEMA) and 88 parts by weight of a diethylene glycol dimethyl ether (DMDG) in a polymerization vessel so as to be agitated and dissolved, and thereafter 7 parts by weight of a 2,2-azo bis(2-methyl butylonitrile) were added and dissolved evenly. Therafter, it was agitated for 2 hours at 85° C. in the nitrogen atmosphere flow, and furthermore, reacted for 1 hour at 100° C. Furthermore, 7 parts by weight of a glycidyl methacrylate (GMA) 0.4 part by weight of a triethyl amine and 0.2 part by weight of a hydroquinone were added to the obtained solution so as to be agitated for 5 hours at 100° C. for obtaining a copolymer resin solution (solid content 50%).

(Preparation of the Hardening Resin Composition 1)

By agitating the below-mentioned materials at a room temperature, a hardening resin composition 1 was provided.

The above-mentioned copolymer resin solution (solid content 50%): 16 parts by weight Dipentaerythritol pentaacrylate (Sartomer Company Inc., SR399): 24 parts by weight Orthocresol novolak type epoxy resin (manufactured by Japan Epoxy Resins Co., Ltd., EPICOAT 180S70) : 4 parts by weight 2-methyl-1-(4-methyl thiophenyl)-2-morpholino propane-1-on: 4 parts by weight Diethylene glycol dimethyl ether: 52 parts by weight (Formation of the Black Matrix)

First, by mixing the components of the below-mentioned amounts with a sand mill so as to be sufficiently dispersed, a black pigment dispersion was prepared.

Black pigment: 23 parts by weight

Polymer dispersing agent (manufactured by BYK-Chemie Japan KK, Disiperbyk 111): 2 parts by weight Solvent (diethylene glycol dimethyl ether): 75 parts by weight Next, by sufficiently mixing the components of the below-mentioned amounts, a composition for a light shielding part was obtained.

The above-mentioned black pigment dispersion: 61 parts by weight

Hardening resin composition 1: 20 parts by weight

Diethylene glycol dimethyl ether: 30 parts by weight

Then, by coating the composition for a light shielding part onto a 1.1 mm thickness glass substrate (manufactured by ASAHI GLASS CO., LTD., AN material) with a spin coater, drying at 100° C. for 3 minutes, about a 1 µm thickness light shielding part was formed. After exposing the light shielding layer with an ultra high pressure mercury lamp in a light shielding pattern, it was developed with a 0.05% aqueous solution of a potassium hydroxide. Thereafter, by leaving the substrate in a 180° C. atmosphere for 30 minutes for applying a heat treatment, a black matrix was formed in a region for forming the light shielding part.

(Formation of the Colored Layer and the Pedestal)

A red hardening resin composition of the below-mentioned composition was coated onto the substrate with the black matrix formed as mentioned above by a spin coating method (coating thickness 1.5 µm), and then it was dried for 30 minutes in a 70° C. oven.

Then, with a photo mask disposed at a 100 µm distance from the coating film of the red hardening resin composition, an ultraviolet ray was irradiated for 10 seconds only in a region corresponding to the region for forming the colored layer and the pedestal using a 2.0 kW ultra high pressure mercury lamp by aproximity aligner. Then, by the alkaline development while soaking the same for 1 minute in a 0.05 wt % potassium hydroxide aqueous solution (liquid temperature 23° C.), only the unhardened portion of the coating film of the red hardening resin composition was eliminated. Thereafter, by leaving the substrate for 30 minutes in a 180° C. atmosphere for applying the heat treatment, a 20 μm×20 μm relief pattern was formed in the region for forming the red pixels and the region for forming the columnar spacers as the pedestals so as to have a predetermined number density.

Next, by using the green hardening region composition of the below-mentioned composition, a green relief pattern was formed in the region for forming the green pixels by the same process as in the red relief pattern formation except that the pedestals were not formed.

Furthermore, by using the blue hardening region composition of the below-mentioned composition, a blue relief pattern was formed in the region for forming the blue pixels by the same process as in the red relief pattern formation except that the pedestals were not formed so as to form a colored layer consist of three colors of red (R), green (G) and blue (B).

a. Composition of the Red Hardening Resin Composition
    C. I. Pigment red 177: 10 parts by weight
    Polysulfonic acid type polymer dispersing agent: 3 parts by weight
    Hardening resin composition 1: 5 parts by weight
    Acetic acid-3-methoxy butyl: 82 parts by weight b. Composition of the Green Hardening Resin Composition
    C. I. Pigment green 36: 10 parts by weight
    Polysulfonic acid type polymer dispersing agent: 3 parts by weight
    Hardening resin composition 1: 5 parts by weight
    Acetic acid-3-methoxy butyl: 82 parts by weight c. Composition of the Blue Hardening Resin Composition
    C. I. Pigment blue 15:6: 10 parts by weight
    Polysulfonic acid type polymer dispersing agent: 3 parts by weight
    Hardening resin composition 1: 5 parts by weight
    Acetic acid-3-methoxy butyl: 82 parts by weight (Formation of the Overcoat)

By coating and drying the hardening resin composition by the spin coating method onto the substrate with the colored layer formed as mentioned above, a coating film of a 2 μm dry film thickness was formed.

With a photo mask disposed at a 100 μm distance from the coating film of the hardening resin composition, an ultraviolet ray was irradiated for 10 seconds only in a region corresponding to the region for forming the colored layer using a 2.0 kW ultra high pressure mercury lamp by aproximity aligner. Then, by the alkaline development while soaking the same for 1 minute in a 0.05 wt % potassium hydroxide aqueous solution (liquid temperature 23° C.), only the unhardened portion of the coating film of the hardening resin composition was eliminated. Thereafter, by leaving the substrate for 30 minutes in a 200° C. atmosphere for applying the heat treatment, an overcoat layer was formed.

(Formation of the Spacer)

By coating and drying the hardening resin composition 1 by the spin coating method onto the substrate with the colored layer and the pedestal formed as mentioned above, a coating film was formed.

With a photo mask disposed at a 100 μm distance from the coating film of the hardening resin composition 1, an ultraviolet ray was irradiated for 10 seconds only in a region for forming the spacer on the black matrix using a 2.0 kW ultra high pressure mercury lamp by a proximity aligner. Then, by the alkaline development while soaking the same for 1 minute in a 0.05 wt % potassium hydroxide aqueous solution (liquid temperature 23° C.), only the unhardened portion of the coating film of the hardening resin composition was eliminated. Thereafter, by applying a heat treatment with the substrate left for 30 minutes in a 200° C. atmosphere, a fixed spacer having a 100 μm$^2$ upper end part area and a 3.68 μm height was formed on the pedestal by a number density 8 pieces/mm$^2$, and 15 pieces/mm$^2$ in a portion without the pedestal. The maximum deformation amount of the spacer without the pedestal at the time of the 80 mN load was 0.68 μm, and the maximum deformation amount of the spacer on the pedestal at the time of the 80 mN load was 0.72 μm.

As to the measurement method for the rigidity of the columnar spacer, it was carried out by the following method using Fischer Scope H-100 manufactured by Fischer Instruments KK (using an indenter having a 100 μm×100 μm plane by polishing the head part of Vickers indenter (quadrangular pyramid-like)) First, a load was applied by up to 80 mN using the indenter to the upper bottom surface of the columnar spacer with a 22 mPa/sec load applying speed in the columnar spacer axial direction. Next, it was maintained for 5 seconds in the state with the 80 mN load applied. Thereafter, the load was eliminated to 0 mN by a 22 mPa/sec load eliminating speed so as to be maintained for 5 seconds in a state with the load eliminated (0 mN state). The deformation amount of the columnar spacer in this series of processes was measured so that the value at the time of maximally deforming the columnar spacer was provided as the maximum deformation amount.

(Production of the Liquid Crystal Display Apparatus)

A transparent electrode was formed on the surface including the fixed spacer of the color filter obtained as mentioned above at a 200° C. substrate temperature using an argon and an oxygen as the discharge gas by the DC magnetron sputtering method with an ITO as the target. Thereafter, an alignment layer made of a polyimide was formed further on the transparent electrode.

Then, a cell was assembled by dropping a TN liquid crystal by a necessary amount onto the glass substrate with the TFT formed and exposing with the color filters superimposed using a UV hardening resin as the sealing material by a 400 mJ/cm$^2$ irradiation amount while applying a 0.3 kgf/cm$^2$ pressure at a room temperature so as to produce a liquid crystal display apparatus of the present invention.

Example 2

(Preparation of the Hardening Resin Composition 2)

By agitating and mixing the below-mentioned materials at a room temperature, a hardening resin composition 2 was provided.
    The above-mentioned copolymer resin solution (solid content 50%): 20 parts by weight
    Dipentaerythritol pentaacrylate (Sartomer Company Inc., SR399): 20 parts by weight
    Orthocresol novolak type epoxy resin (manufactured by Japan Epoxy Resins Co., Ltd., EPICOAT 180S70): 4 parts by weight
    2-methyl-1-(4-methyl thiophenyl)-2-morpholino propane-1-on: 4 parts by weight
    Diethylene glycol dimethyl ether: 52 parts by weight (Formation of the Black Matrix)

A black matrix was formed in the same manner as example 1.

(Formation of the Colored Layer)

A red relief pattern was formed by the same process as in the red relief pattern formation of example 1 except that the pedestals were not formed. Subsequently, a green relief pattern and a blue relief pattern were formed.

(Formation of the Overcoat Layer)

An overcoat layer was formed in the same manner as example 1.

(Formation of the Spacer 1)

By coating and drying the hardening resin composition 1 by the spin coating method onto the substrate 1 with the colored layer formed as mentioned above, a coating film was formed.

With a photo mask disposed at a 100 μm distance from the coating film of the hardening resin composition 1, an ultraviolet ray was irradiated for 10 seconds only in a region for forming the spacer on the black matrix using a 2.0 kW ultra high pressure mercury lamp by a proximity aligner. Then, by the alkaline development while soaking the same for 1 minute in a 0.05 wt % potassium hydroxide aqueous solution (liquid temperature 23° C.), only the unhardened portion of the coating film of the hardening resin composition was eliminated. Thereafter, by applying a heat treatment with the substrate left for 30 minutes in a 200° C. atmosphere, a fixed spacer 1 having a 100 μm² upper end part area and a 3.68 μm height was formed by a number density 15 pieces/mm². The maximum deformation amount of the obtained spacer 1 at the time of the 80 mN load was 0.68 μm.

(Formation of the Spacer 2)

As in the same process as the formation of the spacer 1 except that the hardening resin composition 2 was used, a fixed spacer 2 having a 100 μm² upper end part area and a 3.85 μm height was formed by a number density 8 pieces/mm². The maximum deformation amount of the obtained spacer 2 at the time of the 80 mN load was 0.75 μm.

(Production of the Liquid Crystal Display Apparatus)

A liquid crystal display apparatus was formed in the same manner as example 1.

Example 3

A liquid crystal display apparatus was formed in the same manner as example 2 except that, instead of the spacer 2, a spacer 3 was formed by using the hardening resin composition 1. The spacer 3 had an upper end part area of 50 μm² and a height of 3.83 μm with a number density 8 pieces/mm². Further, at the time, the maximum deformation amount of the spacer 1 at the time of the 80 mN load was 0.68 μm; and the maximum deformation amount of the spacer 3 at the time of the 80 mN load was 1.00 μm Example 4

A liquid crystal display apparatus was formed in the same manner as example 2 except that a spacer 1 was formed by using the hardening resin composition 2.

Comparative Example 1

A liquid crystal display apparatus was formed in the same manner as example 2 except that a spacer 2 was not formed.

Comparative Example 2

A liquid crystal display apparatus was formed in the same manner as example 2 except that a number density of a spacer 1 was 4 pieces/mm² and a number density of a spacer 2 was 20 pieces/mm².

Comparative Example 3

A liquid crystal display apparatus was formed in the same manner as comparative example 1 except that a number density of a spacer was 25 pieces/mm².

[Evaluation]

The finger push test, the low temperature test, the displacement amount between 80 mN to 400 mN, and the displacement amount between 600 mN to 950 mN of the examples 1 to 4, and the comparative examples 1 to 3 are shown in the below-mentioned table 1.

TABLE 1

|  | Displacement amount A between 80 mN to 400 mN (μm) | Displacement amount B between 600 mN to 950 mN (μm) | B/A × 100 | Finger push test | Low temperature test |
| --- | --- | --- | --- | --- | --- |
| Example 1 | 0.191 | 0.151 | 79 | ○ | ○ |
| Example 2 | 0.223 | 0.155 | 70 | ○ | ○ |
| Example 3 | 0.271 | 0.157 | 58 | ○ | ○ |
| Example 4 | 0.380 | 0.055 | 14 | Δ | Δ |
| Comparative example 1 | 0.089 | 0.022 | 25 | X | X |
| Comparative example 2 | 0.062 | 0.061 | 98 | ○ | X |
| Comparative example 3 | 0.103 | 0.047 | 46 | X | ○ |

As to the examples 1 to 3, since the displacement amount A between 80 mN to 400 mN was in a range of 0.1 to 0.8, and the displacement amount B between 600 mN to 950 mN was in a range of 0.05 to 0.5, and the displacement amount B with the premise that the displacement amount A is 100 was in a range of 30 to 200, the favorable results were obtained in the finger push test and the low temperature test. Moreover, as to the example 4, even though the displacement amount A between 80 mN to 400 mN was in a range of 0.1 to 0.8, and the displacement amount B between 600 mN to 950 mN was in a range of 0.05 to 0.5, since the displacement amount B with the premise that the displacement amount A is 100 was out of the range of 30 to 200, the results of the finger push test and the low temperature test were slightly poor compared with the examples 1 to 3. Nonetheless, the favorable results were obtained compared with the comparative examples 1 to 3.

Here, each of the values was measured by the following method.

(Measurement of the Displacement Amount)

The deformation amount of the columnar spacer at the time of applying a load between 80 mN and 400 mN using the below-mentioned indenter by a load applying speed of 2.22 mN/sec in the columnar spacer axial direction under the 23° C. condition with a 2 mmφ metal piece contacted with either of the transparent substrates was measured. By calculating the difference between the largest deformation amount of the columnar spacer and the smallest deformation amount in this range, the displacement amount in the range can be obtained. The above-mentioned displacement amount between 600 mN to 950 mN can also be obtained in the same manner. As to the indenter, Fischer Scope H-100 manufactured by Fischer Instruments KK (using an indenter having a 100 μm×100 μm plane by polishing the head part of Vickers indenter (quadrangular pyramid-like) can be used.

(Finger Push Test)

By strongly pushing a part of the display surface of the liquid crystal display apparatus with a finger, the display mura before and after pushing was evaluated visually.

(Low Temperature Test)

The display mura after storing the liquid crystal display apparatus at −40° C. for 20 hours and at the time of returning the same to a room temperature was evaluated visually.

The invention claimed is:

1. A liquid crystal display apparatus comprising at least two sheets of transparent substrates, a liquid crystal layer sealed between the two sheets of transparent substrates, and a plurality of columnar spacers formed between the two sheets of transparent substrates for keeping a gap between the two sheets of transparent substrates at a specified gap,
wherein a displacement amount between an 80 mN to 400 mN load is in a range of 0.1 mm to 08 mm, and a displacement amount between a 600 mN to 950 mN load is in a range of 0.05 mm to 0.5 mm at a time of applying a load by a measurement method in a direction so as to reduce the gap between the two sheets of transparent substrates to a display area of the two sheets of transparent substrates;
wherein, by the measurement method, a deformation amount against the load is measured by applying the load in a vertical direction to a transparent substrate surface with an indenter having a 2 mmφ plane by a 2.22 mN/sec applied load contacted with either of the transparent substrate side under a 23° C. condition.

2. A liquid crystal display apparatus comprising at least two sheets of transparent substrates, a liquid crystal layer sealed between the two sheets of transparent substrates, and a plurality of columnar spacers formed between the two sheets of transparent substrates for keeping a gap between the two sheets of transparent substrates at a specified gap,
wherein with a premise that a displacement amount between an 80 mN to 400 mN load is 100, a displacement amount between a 600 mN to 950 mN load is in a range of 30 to 200 at a time of applying a load by a measurement method in a direction so as to reduce the gap between the two sheets of transparent substrates to a display area of the two sheets of transparent substrates;
wherein, by the measurement method, a deformation amount against the load is measured by applying the load in a vertical direction to a transparent substrate surface with an indenter having a 2 mmφ plane by a 2.22 mN/sec applied load contacted with either of the transparent substrate side under a 23° C. condition.

3. The liquid crystal display apparatus according to claim 1, wherein the plurality of columnar spacers formed so as to be distributed homogenously in the display area are at least two kinds of columnar spacers having different heights.

4. The liquid crystal display apparatus according to claim 2, wherein the plurality of columnar spacers formed so as to be distributed homogenously in the display area are at least two kinds of columnar spacers having different heights.

5. The liquid crystal display apparatus according to claim 3, wherein the at least two kinds of the columnar spacers having different heights are formed with one kind of material such that the height difference as the columnar spacers can be provided in accordance with a presence or an absence of a pedestal or by a height difference of the pedestal.

6. The liquid crystal display apparatus according to claim 4, wherein the at least two kinds of the columnar spacers having different heights are formed with one kind of material such that the height difference as the columnar spacers can be provided in accordance with a presence or an absence of a pedestal or by a height difference of the pedestal.

7. The liquid crystal display apparatus according to claim 5, wherein the pedestal is formed of at least one kind of layer selected from a group consisting of a colored layer, a light shielding layer and an over coat layer.

8. The liquid crystal display apparatus according to claim 6, wherein the pedestal is formed of at least one kind of layer selected from a group consisting of a colored layer, a light shielding layer and an over coat layer.

9. The liquid crystal display apparatus according to claim 3, wherein the at least two kinds of the columnar spacers having different heights are formed with at least two kinds of materials having different hardness such that a lower hardness material is used for a higher columnar space.

10. The liquid crystal display apparatus according to claim 4, wherein the at least two kinds of the columnar spacers having different heights are formed with at least two kinds of materials having different hardness such that a lower hardness material Is used for a higher columnar space.

11. The liquid crystal display apparatus according to claim 3, wherein the at least two kinds of the columnar spacers having different heights have at least two kinds of shapes with different upper bottom surface areas such that a higher columnar space Is formed so as to have a smaller upper bottom surface area.

12. The liquid crystal display apparatus according to claim 4, wherein the at least two kinds of the columnar spacers having different heights have at least two kinds of shapes with different upper bottom surface areas such that a higher columnar space Is formed so as to have a smaller upper bottom surface area.

13. The liquid crystal display apparatus according to claim 3, wherein a height difference between a highest columnar space and a lowest columnar space of the at least two kinds of the columnar spacers having different heights is in a range of 0.02 mm 0.5 mm.

14. The liquid crystal display apparatus according to claim 4, wherein a height difference between a highest columnar space and a lowest columnar space of the at least two kinds of the columnar spacers having different heights is in a range of 0.02 mm 0.5 mm.

15. The liquid crystal display apparatus according to claim 1, wherein the plurality of columnar spacers formed in the display area is provided by laminating two kinds of materials having a same height and a different hardness respectively.

16. The liquid crystal display apparatus according to claim 2, wherein the plurality of columnar spacers formed in the display area is provided by laminating two kinds of materials having a same height and a different hardness respectively.

* * * * *